Figure 1:
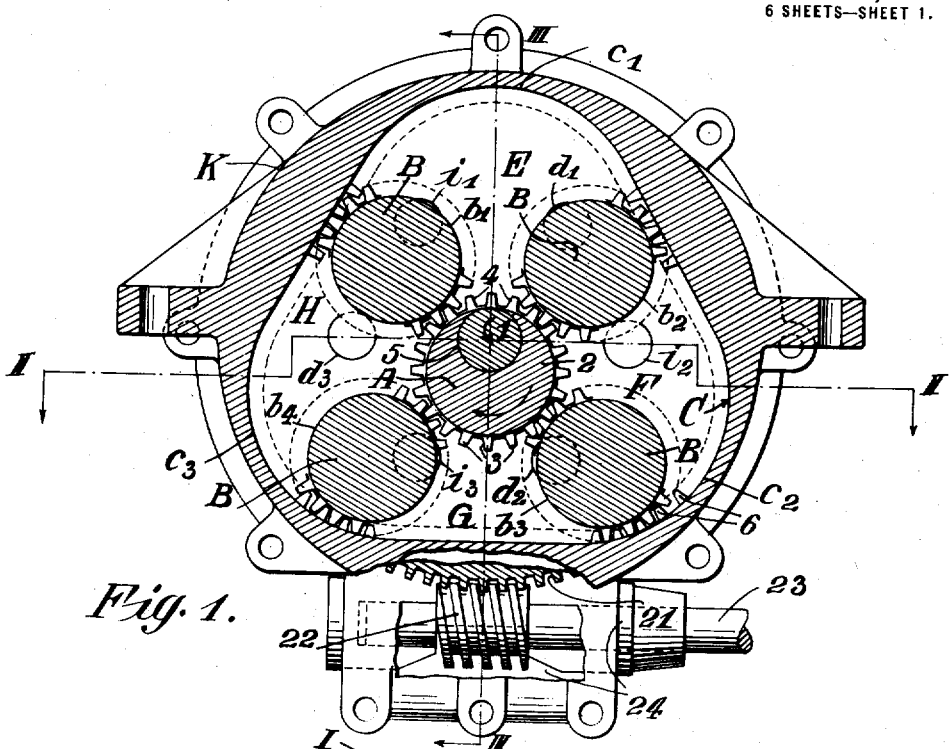

H. DOCK.

ROTARY ENGINE.

APPLICATION FILED FEB. 3, 1916.

Reissued Aug. 29, 1916.

14,187.

6 SHEETS—SHEET 1.

Witness

Fred. Roegner

Inventor

Herman Dock

By his Attorney

Howard Ray

H. DOCK.

ROTARY ENGINE.

APPLICATION FILED FEB. 3, 1916.

Reissued Aug. 29, 1916.

14,187.

6 SHEETS—SHEET 2.

Witness

Fred. Roeger.

Inventor

Herman Dock

By his Attorney

Howard Day

H. DOCK.

ROTARY ENGINE.

APPLICATION FILED FEB. 3, 1916.

Reissued Aug. 29, 1916.

14,187.

6 SHEETS—SHEET 3.

Maximum Discharge

Witness

Fred. Rogers.

Inventor

Herman Dock

By his Attorney

Howard Day

H. DOCK.

ROTARY ENGINE.

APPLICATION FILED FEB. 3, 1916.

Reissued Aug. 29, 1916.

14,187.

6 SHEETS—SHEET 4.

*Half Discharge*

Witness

Fred. Roegner.

Inventor

Herman Dock

By his Attorney

Howard Day

H. DOCK.

ROTARY ENGINE.

APPLICATION FILED FEB. 3, 1916.

Reissued Aug. 29, 1916.

14,187.

6 SHEETS—SHEET 5.

*No Discharge*

Witness

Fred. Roeger.

Inventor

Herman Dock

By his Attorney

Howard Day

H. DOCK.

ROTARY ENGINE.

APPLICATION FILED FEB. 3, 1916.

Reissued Aug. 29, 1916.

14,187.

6 SHEETS—SHEET 6.

*Half Discharge - Reverse Flow*

Witness

Fred. Rogers.

Inventor

Herman Dock

By his Attorney

Thomas Dey

UNITED STATES PATENT OFFICE.

HERMAN DOCK, OF WESTERLY, RHODE ISLAND, ASSIGNOR TO AMERICAN ROTARY POWER COMPANY, OF BOSTON, MASSACHUSETTS, A CORPORATION OF MAINE.

ROTARY ENGINE.

14,187. Specification of Reissued Letters Patent. Reissued Aug. 29, 1916.

Original No. 1,087,735, dated February 17, 1914, Serial No. 762,048, filed April 18, 1913. Application for reissue filed February 3, 1916. Serial No. 76,061.

*To all whom it may concern:*

Be it known that I, HERMAN DOCK, a citizen of the United States of America, residing at Westerly, in the county of Washington and State of Rhode Island, have invented a new and useful Rotary Engine, of which the following is a specification.

My invention relates to a rotary engine, by which term I include the type in which externally applied power causes my engine to displace and deliver a fluid such as a gas or liquid and also the type in which a fluid such as a gas or liquid under pressure operates the engine to cause it to deliver mechanical power. The first mentioned type comprises specifically pumps and the second mentioned type comprises specifically motors.

The object of my invention is primarily to produce a durable, efficient and cheap rotary engine.

More specifically, the object of my invention is to produce a rotary engine comprising working chambers which are simple in structure, fluid-tight and frictionless even under high speed and pressure.

In furtherance of the above object, my engine in its preferred form comprises essentially four elements,—a rotor, having external gear teeth; a ring, having internal gear teeth; a set of gear-toothed floaters, meshing commonly and continuously between and with said rotor and said ring; and a fluid-tight casing, having ports and completing a working chamber between each pair of adjacent floaters. The relative contours of the working peripheries of said rotor, said floaters and said ring must be such that the radial distance between said ring and said rotor is different for different radial lines of measurement. This radial distance is to be understood as measured on a radial line extending out from the axis of the engine. In explanation of the last statement it should be borne in mind that it is a fundamental necessity for the working chambers to increase and decrease in volume, otherwise they would not be working chambers. Inasmuch as the working chambers are the spaces between each pair of adjacent floaters it becomes a necessity that there be for the floaters of each pair either (1) a difference in their instantaneous speeds of revolution about the axis of the rotor or (2) a difference in the diametrical cross-sections which extend radially across from ring to rotor and are effective as pistons or displacers or (3) a combination of the two. The first involves the use of a rotor having a lobe or non-concentric portion. The second involves the use of non-circular floaters or piston means, the aforementioned radial diameter of which varies for different radial lines of measurement. In order that either the first or the second of these features, or both the first and the second of these features, be present there must be a variation in the radial distance between the ring and the rotor for different radial positions, as recited above.

In this description of the four essential elements, the term "rotor" is employed for convenience and is not to be understood as limiting the part so designated to one having rotation, because, essentially there need be provision merely for a relative working movement between each piston means and either the ring or the rotor or both.

The rotor, in the construction illustrated, is mounted on the engine shaft and preferably is so shaped and mounted relatively to its axis of rotation as to provide a lobe on its periphery, the gear teeth on which lobe are non-concentric or eccentric with (or have a greater radius from the axis than) other teeth on another portion of the rotor. This eccentricity is essentially only the provision of a gear the teeth of which at the lobe have a greater operating radius than do other teeth on the gear. The fact that the rotor actually illustrated in the drawings is what is technically known as an eccentric gear, that is a right-circular cylindrical gear mounted to rotate off center, should not be understood as the only example of a rotor embodying the lobe idea of the invention.

For use with a rotor having a lobe it is preferable that the floaters be right-circular cylindrical gears. It is also preferable, especially for high pressure service, that the gear teeth on the three sets of gears, the rotor, the floaters and the ring be axially co-extensive with the gears themselves, so that a most important advantage of the invention is obtained, namely, the efficient fluid sealing by the intermeshing teeth of these gears of the major portion of each working chamber. In fact, the greater the pressure in a working chamber the tighter is the fluid-seal because the floaters, in the embodiment illustrated, are free from any axial bearing and their teeth are pressed tight although progressively against the teeth of the rotor and the ring.

A further object of my invention is to provide means in a rotary engine of the general type described for varying its operation through the medium of port control.

The above and further objects of my invention will be set forth more in detail in the accompanying claims and will be clear from the accompanying specification which may be read upon the illustrative embodiment of my invention shown in the accompanying drawings which form a part hereof.

Figure 2:
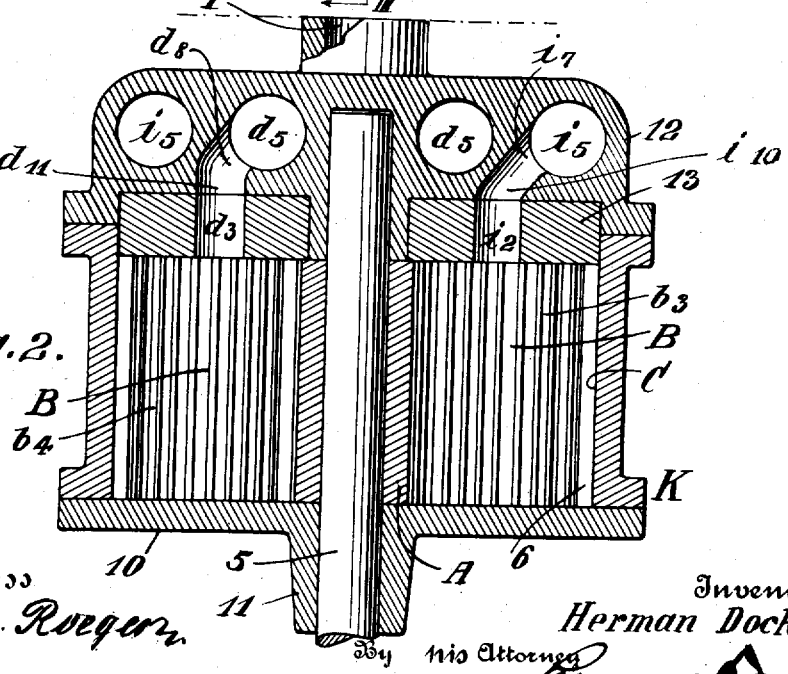
Figure 3:
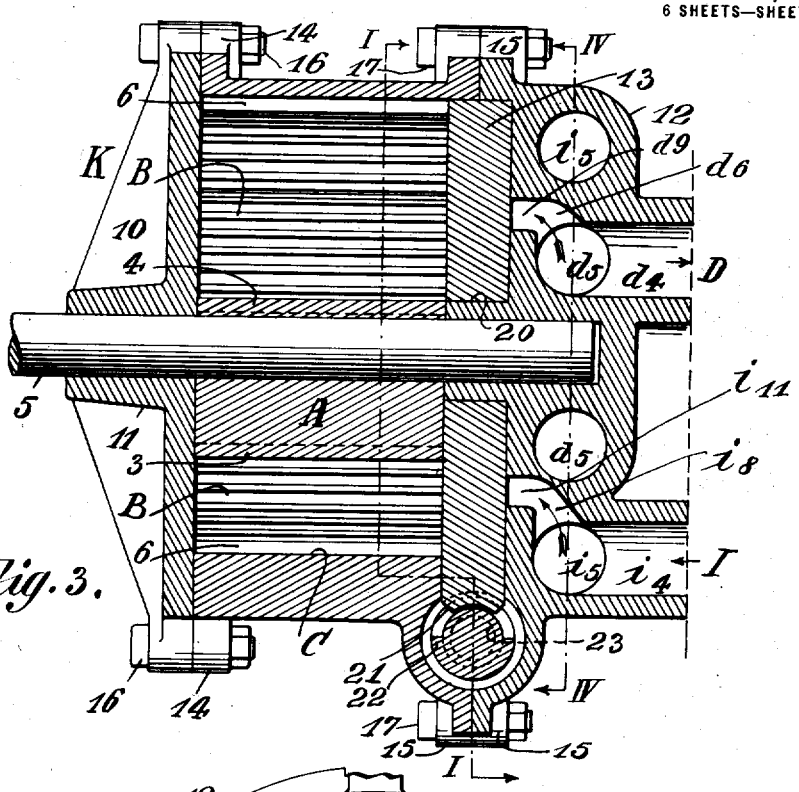
Figure 4:
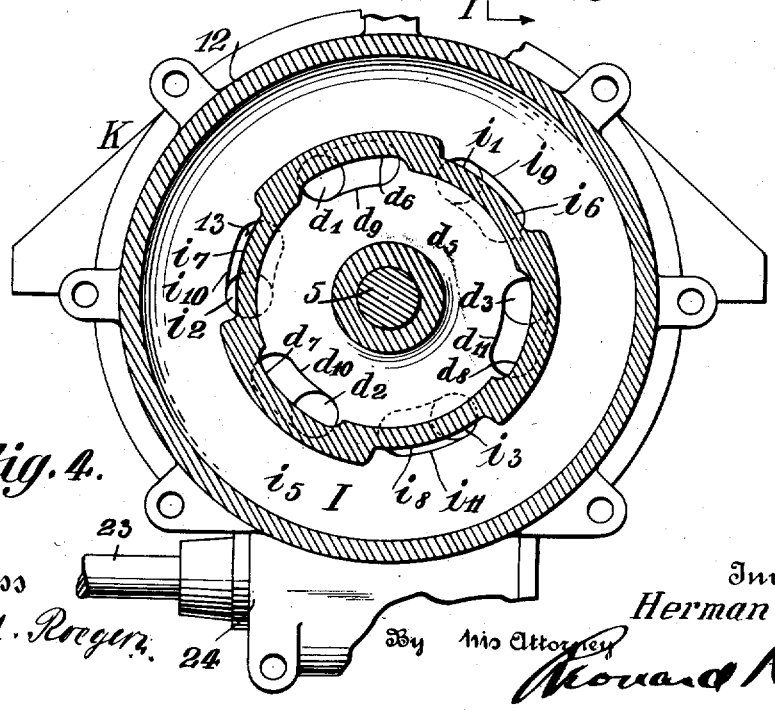
Figure 5:
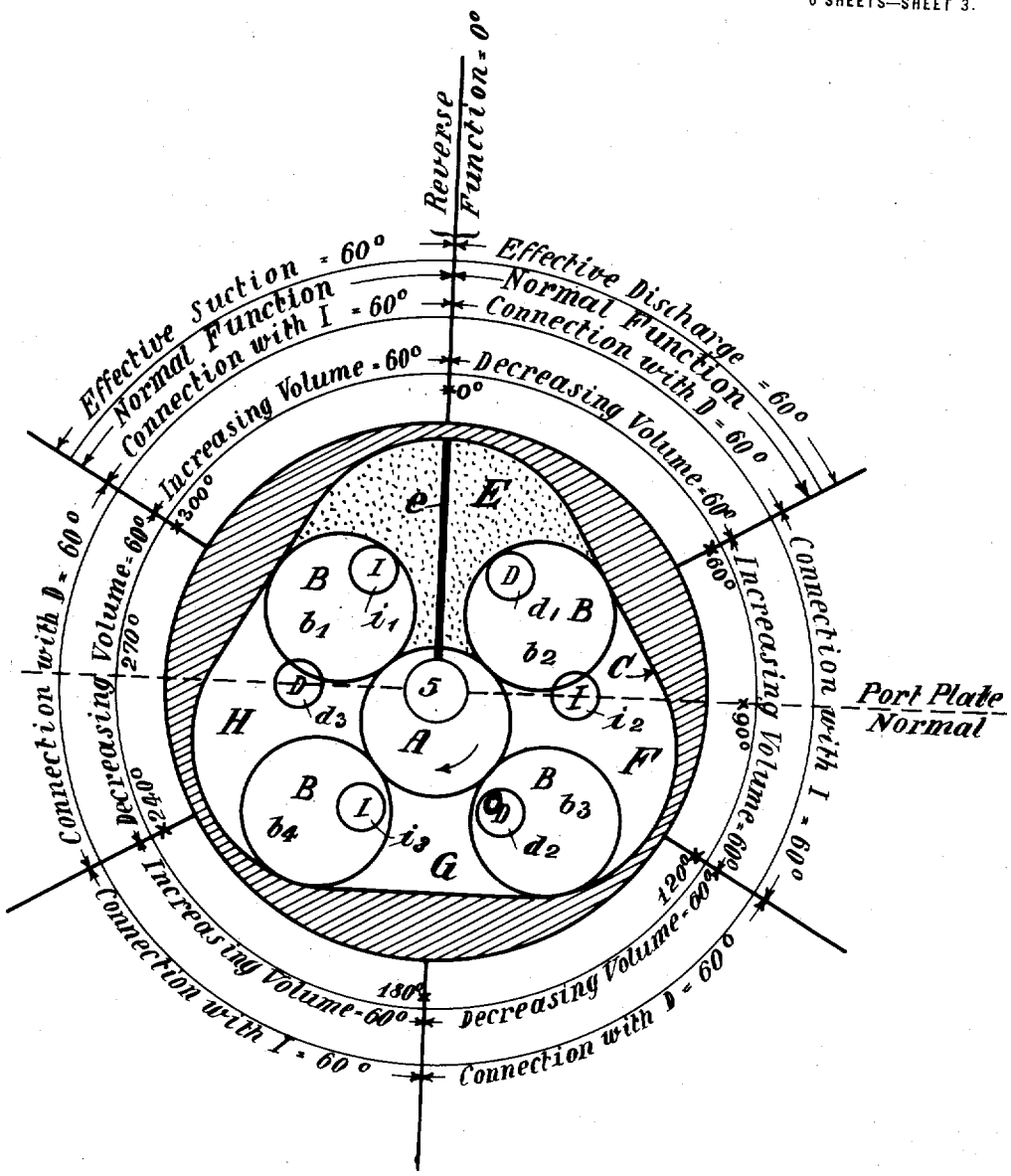
Figure 6:
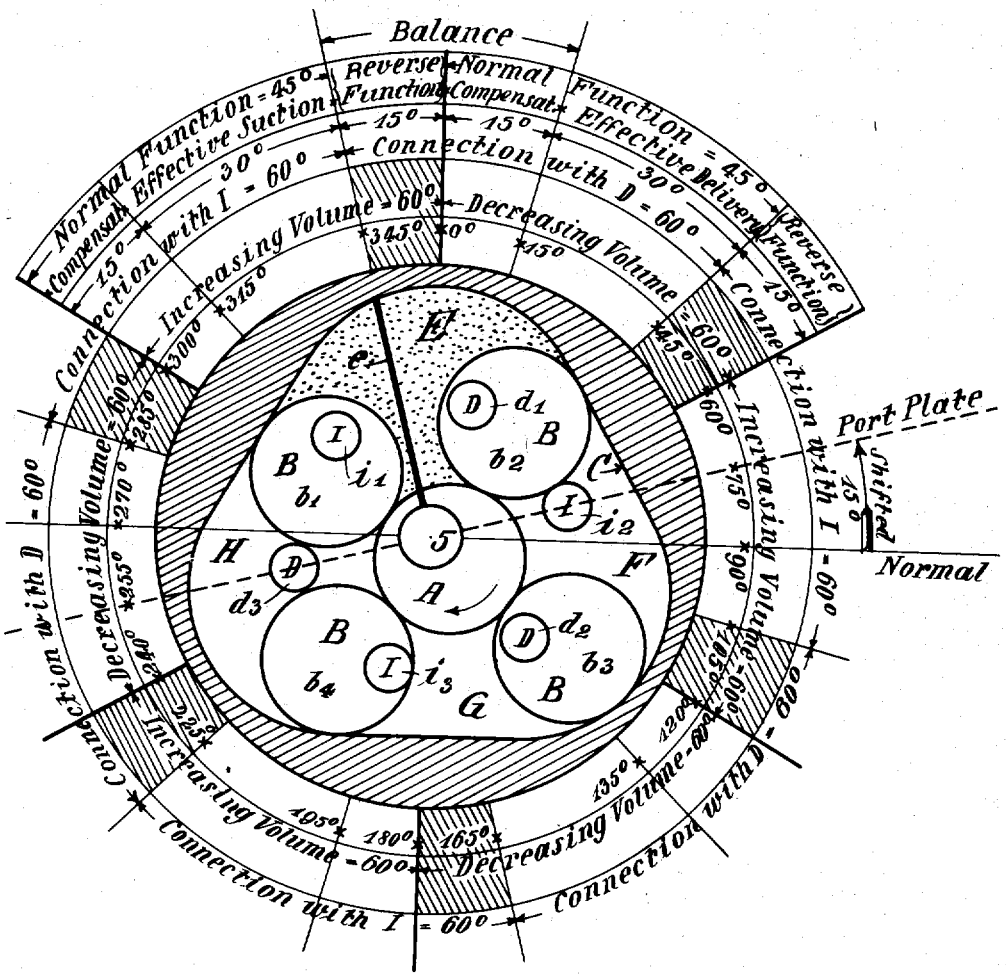
Figure 7:
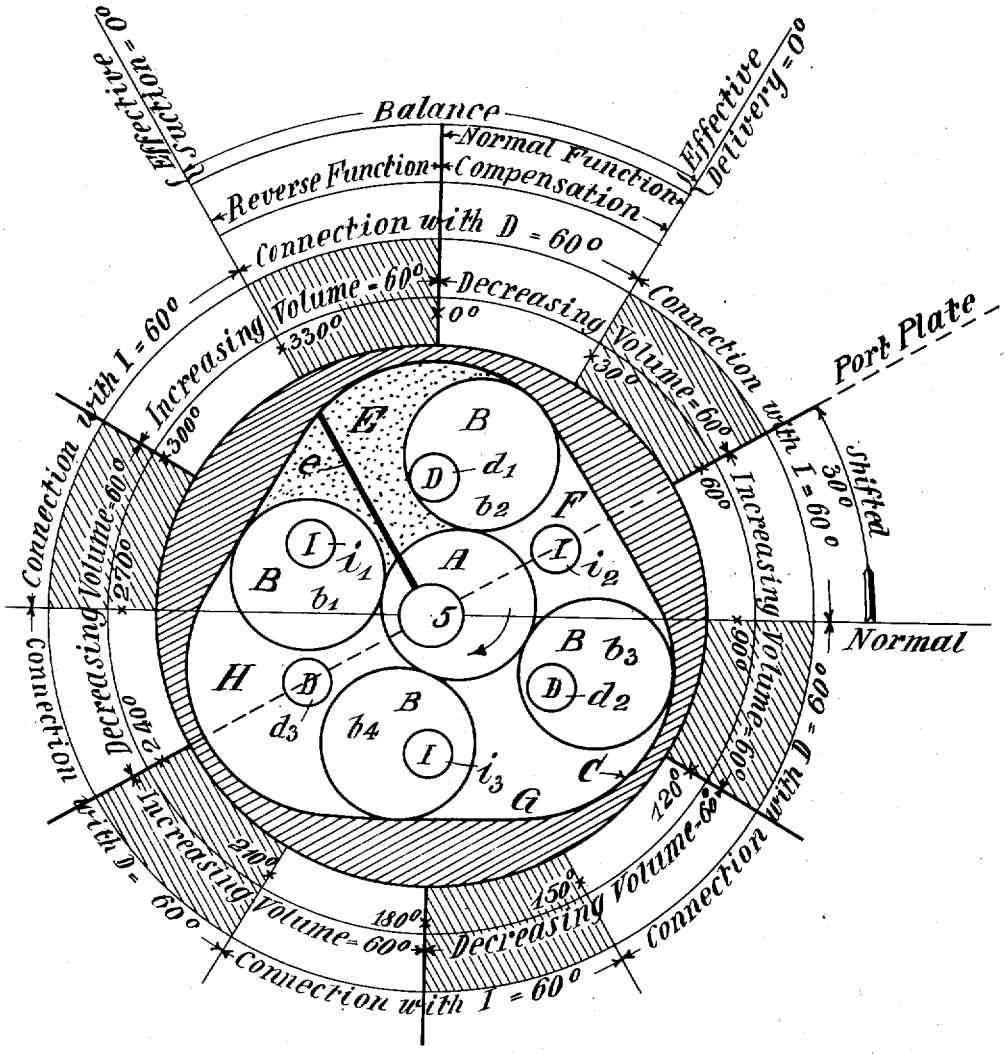
Figure 8:
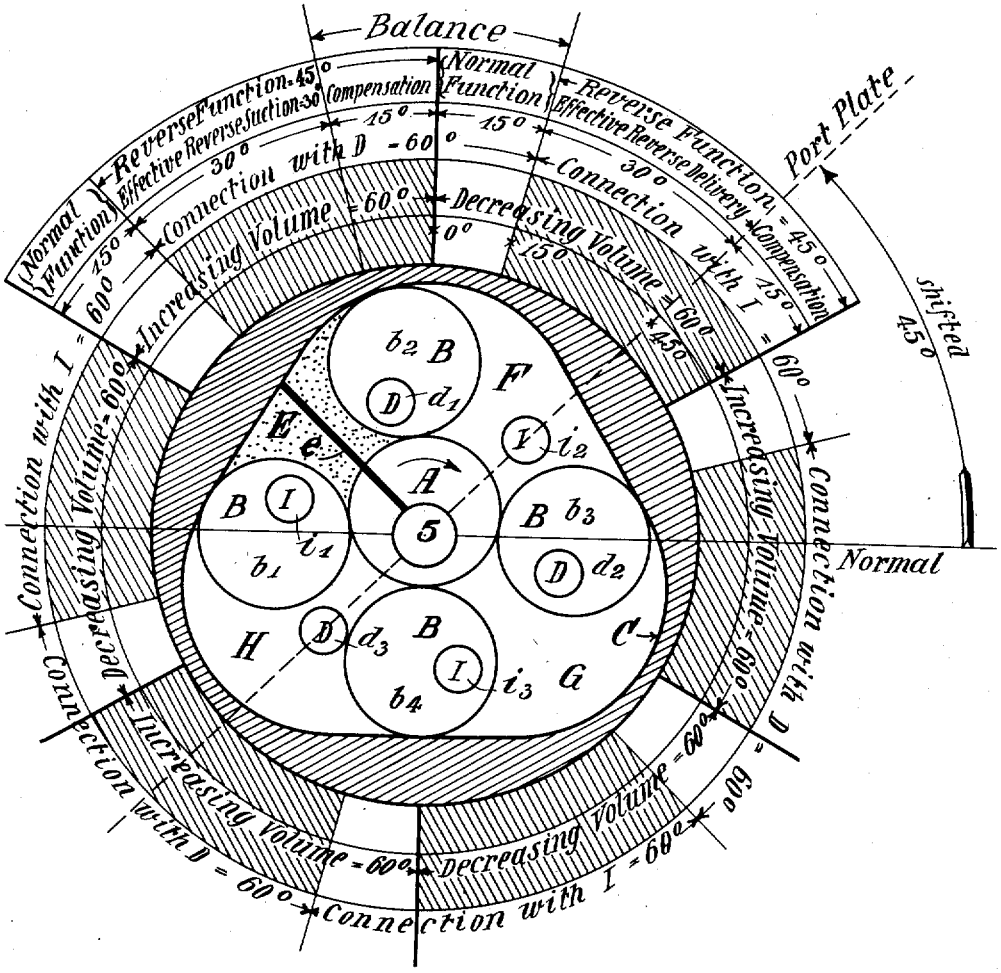

In these drawings Figure 1 is a cross section on line I—I of Fig. 3 with parts cut away and parts shown in elevation; Fig. 2 is a horizontal section on line II—II of Fig. 1, parts being shown in plan; Fig. 3 is a vertical axial section on line III—III of Fig. 1; Fig. 4 is a cross section on line IV—IV of Fig. 3, showing ports and fluid passages; Fig. 5 is a diagram of operation for the normal position or the position of the port-plate when the pump is discharging its maximum capacity; Fig. 6 is a diagram of operation for the position of the port-plate when the pump is discharging at half its capacity; Fig. 7 is a diagram of operation for the position of the port-plate when the pump is not discharging at all; and Fig. 8 is a diagram of operation for the position of the port-plate when the pump is discharging half its maximum capacity with reverse flow.

Referring to the drawings, A is the rotor shown as one embodiment illustrative of a rotor suitably formed and mounted relatively to its axis of rotation 1 so as to provide a lobe 2, the gear teeth 3 located on which lobe are radially at a greater distance from the axis 1 than other gear teeth 4 on the rotor. In other words, the gear teeth 3 on the lobe and the gear teeth 4 not on the lobe are eccentric or non-concentric relatively to the axis 1. In the embodiment illustrated the rotor A is a right-circular cylindrical gear mounted and fixed upon the shaft 5 out of center so that the lower part of the gear as shown in Fig. 1 forms the lobe. It is to be understood, however, that the invention is by no means limited to the production of a lobe by employing a right-circular cylindrical gear mounted eccentrically. A rotor having a contour other than circular, as well as a circular rotor mounted differently from the embodiment illustrated, are both contemplated within the scope of the invention. In fact any contours for all the gears, and any mounting for the rotor, that fall in combination under the definition that the radial distance from rotor to ring must differ for different radial lines of measurement, are contemplated.

The floaters B, shown in this embodiment as a set of four floaters $b_1$, $b_2$, $b_3$ and $b_4$, each a right-circular cylindrical gear, are inserted loosely and without axial bearing of any kind. Nevertheless, these floaters are positively spaced about the rotor A by the meshing of their teeth with the teeth of the rotor A and the surrounding ring C although the claims are not to be understood as limited to this method of positive spacing. This ring or internal gear C is provided on its inner periphery with gear-teeth to mesh positively with the teeth of the floaters B. The shape of the inner periphery of the ring C is dependent upon the contour and mounting of the rotor A, and upon the contour, dimensions and number of the floaters B, and must be of such contour as to provide, along the pitch lines, continuous tangential contact with the floaters or piston means B in their revolution about the rotor A. In fact the structure is such that rolling contact is always provided along the pitch-lines without slippage both between the floaters and the rotor, on the one hand, and between the floaters and the ring, on the other. In the structure illustrated, the ring C, in its internal contour, is right-cylindrical and has three equally spaced lobes and is shown provided with gear-teeth 6 around its entire inner periphery.

To complete the engine for practical use, an inclosure in the form of a casing is necessary. The gears are all of the same length, axially, and their ends are carefully machined to a common plane, for rubbing contact with a plane end-plate or equivalent at each end. Thus the engine has an annular space formed by a central part illustrated in this embodiment as the rotor; a circumferential part of right-cylindrical contour; and two flat end parts. The casing K illustrated comprises one end-plate 10 providing a suitable bearing 11 for the shaft 5, which may include a suitable packing box if desired; a second end-plate 12 likewise forming a suitable bearing for the other end of the shaft 5; the port-plate 13; and the external part of the ring C. In the embodiment illustrated, the ring C is shown formed as an integral part of the external casing, and has suitable lugs 14 and 15 to receive bolts 16 and 17 for clamping the various parts of the casing together. There are thus formed within the engine four working chambers, namely: chamber E between the floaters $b_1$ and $b_2$; chamber F between the floaters $b_2$ and $b_3$; chamber G between floaters $b_3$ and $b_4$; and chamber H between the floaters $b_4$ and $b_1$. These are the working chambers which increase and decrease in volume with the rotation of the rotor A and the consequent relative approach and separation between adjacent floaters. In Fig. 1 chamber E has maximum volume and chamber G minimum volume.

To take advantage of the increasing and decreasing volume of the working chambers, inlet and delivery passages I and D are suitably formed in the casing, as by coring out the casting from which the casing is constructed. As will be understood later from the description of the diagrams, the present construction of the engine, in which the rotor has one lobe, the ring three lobes, and there are four floaters of the same diameter as the rotor, the result is six working strokes for each revolution of each chamber about the rotor-axis, namely: three strokes in which the working chamber decreases in volume and three strokes in which the working chamber increases in volume. In the embodiment illustrated, it requires four rotations of the rotor A to effect one revolution of one and all the floaters B about the axis 1. To take care of the six working strokes referred to, the fluid passages I and D are each divided into three branches, to take care of three inlet ports $i_1$, $i_2$ and $i_3$ and three delivery ports $d_1$, $d_2$ and $d_3$ respectively. In the embodiment illustrated, the ports are physically located in the port-plate 13, which is illustrated as a movable part of the casing K; but any mobility of this part of the casing K has advantage only to provide control in the operation of the engine as will presently be described. The main inlet-passage $i_4$ leads to an annular chamber $i_5$ from which three passages $i_6$, $i_7$ and $i_8$ extend and are equi-angularly spaced apart. These passages terminate respectively in auxiliary ports $i_9$, $i_{10}$ and $i_{11}$ which are suitably enlarged circumferentially about the axis of the engine and are fixed in position in the fixed casting 12 of the casing K. It is these auxiliary ports with which the ports $i_1$, $i_2$ and $i_3$ in the port-plate 13 respectively connect. In like manner, the main delivery-passage $d_4$ connects with an annular chambered $d_5$, which in turn is connected by passages $d_6$, $d_7$ and $d_8$ with auxiliary ports $d_9$, $d_{10}$ and $d_{11}$ respectively. The auxiliary ports $d_9$, $d_{10}$ and $d_{11}$ are equi-angularly spaced about the axis of the engine midway between the auxiliary inlet-ports and, like the inlet-ports, are circumferentially enlarged and connect respectively with the delivery ports $d_1$, $d_2$ and $d_3$ in the port-plate 13. The circumferential enlargement of the auxiliary inlet-ports $i_9$, $i_{10}$ and $i_{11}$, and the auxiliary delivery-ports $d_9$, $d_{10}$ and $d_{11}$ permits a limited rotation of the port-plate 13, while at the same time maintaining fluid connection between the proper fluid ports of the port-plate and the corresponding fluid-passages. It is to be understood that the circumferential enlargement of the ports should be such as to accommodate the degree of rotary adjustment of port-plate desired.

To effect a rotary adjustment of the port-plate 13, the same is suitably centrally journaled, as upon the bearing 20, and its periphery is provided with suitable teeth 21 to coöperate with the worm 22 driven suitably by the adjusting shaft 23 which is journaled in a suitable thrust-bearing 24, formed in the casing K. A rotation clockwise of the shaft 23 as shown in Fig. 3 causes a counter-clockwise rotation of the port-plate 13 as shown in Fig. 1 and in all the diagrams, but a counter-clockwise rotation as viewed in Fig. 4.

*Operation.*—So far as the mechanical construction of my engine is concerned, the understanding of its operation is simple. Referring particularly to Figs. 1, 2, 3 and 4, some means or provision is necessary to effect a relative working movement between the ring C and the piston means such as the floaters B. When the engine is to be used as a pump the shaft 5 driven from a source of mechanical power is an example of this means, but when the engine is to be used as a motor the inlet and delivery passages I and D fed from a source of fluid under pressure exemplifies this means. The specific form of engine illustrated is most readily adapted to have power applied in the form of a mechanical torque to the shaft 5 to effect a rotation of the rotor A in the direction of the arrow. The rotor A drives the floaters B about with it, but at a slower speed, causing them to revolve about the axis of the rotor A and, at the same time, approaching and receding from one another. The working chambers E, F, G and H are caused to decrease and increase in volume all at the same time (but relatively out of phase) from the maximum volume for the working chamber E to the minimum volume shown for the working chamber G (see Figs. 1 and 5), so that each working chamber completes a cycle of volumetric changes. The inlet and delivery ports $i_1$, $i_2$ and $i_3$ and $d_1$, $d_2$ and $d_3$ are positioned in the structure as illustrated in Figs. 1, 2, 3 and 4 for the delivery ports to take care of delivery when the appropriate working chambers are decreasing in volume and for the inlet ports to take care of the intake when the appropriate chambers are increasing in volume and are opened and closed by the sliding end faces of the floaters themselves. For example, chamber E is about to decrease in volume, throughout which decrease the delivery port $d_1$ takes care of the fluid discharge. The working chamber F is increasing in volume and is being supplied through the inlet port $i_2$. The working chamber G is about to increase in volume and its intake will be accommodated by the inlet port $i_3$. The working chamber H is decreasing in volume and fluid is being expelled through delivery port $d_3$. Fig. 5 shows the above diagrammatically.

The functional operation of the engine will be more readily understood from the diagrams of Figs. 5, 6, 7 and 8. These diagrams have been drawn substantially to represent the structure of the mechanical showing, both as to size and configuration of the various parts, like reference characters having been employed for the sake of clearness. In all the diagrams of Figs. 5, 6, 7 and 8, the angular position of the port-plate is indicated by a dash line through the centers of the ports $d_3$ and $i_2$. The functional operation is diagrammatically indicated for the working chamber E and, for convenience, the position of the working chamber E is considered to be that of the center line *e* shown in heavy black, arbitrarily located approximately midway between the points of cut-off, both for inlet and delivery. Throughout all the diagrams it is understood that the angular measurements are approximate rather than geometrically correct for the several functions depicted.

*Fig. 5—Maximum discharge.*—The diagram of Fig. 5 illustrates the functions for maximum discharge. The port-plate is in normal position and as indicated in Figs. 1, 2, 3, and 4. For this position of the port-plate, decreasing volume for working chamber E continues for a rotation of the radius *e* from 0° to 60°. This same chamber increases in volume from 60° to 120°; decreases in volume from 120° to 180°; increases in volume from 180° to 240°; decreases in volume from 240° to 300°; and increases in volume from 300° to 360°, or the initial 0°. Thus for one complete revolution of the chamber E there are six change-in-volume functions,—three decreases and three increases. For maximum effectiveness of the engine, the connections should be such as to effect complete delivery to the proper passage for the entire period of each decreasing volume function and complete intake from the proper passage (the inlet passage) throughout the entire amount of each increasing volume function. An inspection of the diagram shows that, for the clockwise rotation of the chamber E indicated by the radius *e*, the chamber is in connection with the delivery and the inlet passages in exact phase and of uniform period with the corresponding decreasing and increasing volume functions. As a result, the effective suction and discharge is likewise complete and in phase as indicated on the diagram for movements of chamber E from 300° to 360° and then on a second round to 60°. While the working chamber E is performing its functions each of the three remaining cylinders are performing their functions in an exactly similar manner but in respectively different time phases as will be obvious from the diagram. Inasmuch as all corresponding functions are in phase, as shown in the diagram of Fig. 5, there can be no reverse function (the character of which will be apparent from the description of Figs. 6, 7 and 8), and it is therefore indicated as 0°.

*Fig. 6—Half discharge.*—In the diagram of Fig. 6 the port-plate has been shifted counter-clockwise 15° and the initial position of working chamber E has been commensurately shifted in the same angular direction, together with the floaters B. The mechanical structure itself determines the function of decreasing and increasing volume for each of the chambers. Therefore, in Fig. 6 the decreasing and increasing volume function is identical with that of Fig. 5 and consequently identical with that of Figs. 7 and 8. The shifting of the port-plate, however, changes the time of connection between chamber E and each delivery and inlet port although it makes no change in the duration of time or angle of revolution through which this connection with some port exists. An examination of the diagram shows that connection between the chamber E and the delivery passages takes place 15° too early and stops 15° too early for identity of phase and continuity between the volume function and the connection function. By connection with D 15° too early is meant that throughout a 15° movement of the preceding increasing volume function, the chamber E is connected with the delivery port instead of with an inlet port, whereby fluid is drawn into the expanding chamber from the passages D instead of from the inlet passages I. Thus there results a reverse function indicated by the cross-sectioned area labeled "Reverse Function," which not only represents effective work not done by the engine but represents a fluid pulse done in the wrong direction, which must be subtracted from the normal function which preceded through 45° in order to ascertain the net result. In other works, 15° of the normal function must be subtracted as a compensation to balance the 15° reverse function so that for effective delivery there remains only a 30° revolution of the chamber E. In like manner a similar subtraction and balance is required to determine the effective suction during the increasing volume stroke of the chamber E. Thus we find that instead of a 60° effective function there is but a 30° effective function or one-half maximum which gives for the engine only half discharge. This does not mean a one-half loss in power because the balancing of the reverse function and the compensation function requires only a nonpower consuming pulsation of the fluid through the ports.

*Fig. 7—No discharge.*—In the diagram of Fig. 7 the shifting of the port-plate has been continued in a counter-clockwise direction up to 30°. The decreasing and increasing volume function being the same as in the previous diagrams, we find that the shifting of the connection of the working chamber E with its appropriate passages, so as to take place 30° too early, produces a reverse function which is exactly equal to the normal function. The entire normal function therefore is forced to act as a compensation, the result being that the effective delivery is zero, the part in balance being a complete 60°.

*Fig. 8—Half discharge—reverse flow.*—In the diagram of Fig. 8 the port-plate has been further shifted in a counter-clockwise direction up to 45°. As heretofore described, the function of decreasing and increasing volume for the working chamber remains unchanged in extent and phase, but the working chamber E has been shifted so that its connection with the delivery passage takes place 45° too early and has but a 15° connection with the delivery passage through the time of decreasing volume. Thus, in this figure, the normal function is but 15° out of a total of 60° and the reverse function is 45°. Whereas, in the previous diagrams the reverse function was subtracted arithmetically from the normal function it must now be subtracted algebraically from the normal function and, in the diagram, the normal function finds a compensation 15° counter-clockwise instead of clockwise from itself, and there remains a negative effective function amounting to 30°. In the diagram this reverse function is indicated by the shaded area labeled "Reverse Function=45°." This means that the flow of fluid through the passages is reversed relatively to the flow taking place under the functioning of Figs. 5 and 6, and like that of Fig. 6 is only a one-half discharge.

In all the figures it is to be understood that the shifting of the port-plate counter-clockwise to effect a control of the engine has been merely arbitrary. Obviously the phase relations between ports and the time of decreasing and increasing volume may be affected by shifting the port-plate clockwise as well as counter-clockwise.

The terms of measurement recited in the description of the diagrams are to be understood as illustrative and approximate and should not convey the impression that all the functions recited occur in such mathematically exact measurements as are given in the diagrams.

In the functioning indicated in Fig. 5 it should be noted that, at the instants when a working chamber is cut off from connection with both the inlet and the delivery passages, there is taking place practically no change in its volume. These instants of no change in volume occur at the 0°, 60°, 120°, 180°, 240° and 300° positions on the ring, for each chamber in turn, and these are also the instants of entire cut off and shift from inlet to delivery connection or vice versa. Further, the instants at which the rate of change of volume is a maximum (illustrated approximately by chambers F and H in Fig. 5) are the instants of maximum port-opening. In other words, the area of port-opening is roughly proportional to the rate of volumetric displacement. Therefore the engine with the adjustment of ports shown in Fig. 5 is practically operative at high speeds, with low frictional loss and high efficiency, even when operating with incompressible fluids. But in Figs. 6, 7 and 8 it will be noted that matters are somewhat different. In the adjustment of ports shown in these figures the engine-chambers may exhibit some phases of active change of volume in which there is inadequate port-area for high speeds, or perhaps none at all. In such cases it becomes impracticable to operate the engine upon incompressible fluids, which would develop shock, or perhaps might bar the engine from motion altogether. But in use with compressible fluids such would not be the case. The instants when port-opening might be lacking would then be just those in which a period of closed ports might be desirable or necessary for compression or expansion, as is the case, for instance, in the piston-and-cylinder engine when used with compressible fluids. Thus in the adjustment shown in Fig. 6 there would be a perceptible angular movement of chamber E after port $i_1$ had been closed, before port $d_1$ opened.

It is to be understood that even the mechanical structure illustrated has been shown somewhat diagrammatically and that all adjuncts and mechanical expedients common in an engine of this class are contemplated, including appropriate port design and, if desired, annular packing rings on the ends of the floaters to insure a more complete prevention of leakage between the ends of the gears and the casing. It is further to be understood that no attempt has been made to illustrate every embodiment falling within the scope of the accompanying claims, the full scope of which is contemplated.

What I claim and what I desire to secure by United States Letters Patent is:—

1. A rotary engine comprising a rotor; a ring inclosing an annular space about said rotor, the axial mounting of said rotor and the relative contours of said rotor and ring being such that the radial distance from said ring to said rotor is different for different radial lines of measurement; a plurality of floaters free from engagement one with another and each having continuous rolling contact with both said ring and said rotor and dividing said annular space into a plurality of working chambers, one chamber between each pair of adjacent floaters; and means completing the inclosure at the axial ends of said annular space and providing ports for said working chambers.

2. A rotary engine comprising a rotor; a ring inclosing an annular space about said rotor, the axial mounting of said rotor and the relative contours of said rotor and ring being such that the radial distance from said ring to said rotor is different for different radial lines of measurement; a plurality of floaters free from engagement one with another and each having continuous rolling contact with both said ring and said rotor and dividing said annular space into a plurality of working chambers, one chamber between each pair of adjacent floaters; gear teeth to effect the positive meshing of each floater with both said rotor and said ring; and means completing the inclosure at the axial ends of said annular space and providing ports for said working chambers.

3. A rotary engine comprising an internal curved gear, a central gear having a peripheral lobe, the teeth on which are non-concentric or eccentric with other teeth thereon relatively to the axis of rotation; a plurality of loose gears whose teeth engage the teeth of said central gear and the teeth on the internal gear, said loose gears being rotatable on their own axes and revoluble about said central gear; and confining means at the axial ends of said gears for completing confined spaces between said gears, said confining means having ports to accommodate the inlet and delivery of fluid to and from said confined spaces.

4. A rotary engine comprising a casing, a power-shaft; and revoluble, rotatable floaters in fluid-sealing and power-transmitting engagement with said casing and shaft, said floaters being both revolved positively about said shaft and rotated positively about their own axes.

5. A rotary engine comprising a casing, a rotor; and revoluble, rotatable floaters in fluid-sealing and power-transmitting engagement with said casing and rotor, said floaters being both revolved positively about said rotor and rotated positively about their own axes.

6. A rotary engine comprising a casing, having an internal curved gear, a shaft extending through said casing, an eccentric gear secured to said shaft, and a plurality of loose gears whose teeth engage the teeth on the eccentric gear and those on the internal gear, said loose gears being rotatable on their own axes and also about said shaft, and means for admitting fluid to the spaces between the gears and for withdrawing it from said spaces.

7. A rotary engine comprising a casing having an internal curved gear, a shaft extending through said casing, an eccentric gear secured to said shaft, and a plurality of loose gears whose teeth engage the teeth on the eccentric gear and those on the internal gear, said loose gears being rotatable on their own axes and also about said shaft, said casing having admission and exhaust conduits, and a movable plate having port openings therein for controlling the flow of fluid.

8. In a rotary engine, the combination with a casing, of a power shaft having thereon a motor element within the casing, loose rotatable piston elements arranged between said motor element and casing, and inter-engaging said motor element and casing; and means for imparting positive rotation to said piston elements.

9. In a rotary engine, means forming an annular chamber; a plurality of piston-elements movable within said annular chamber; and means for imparting, varying instantaneous velocities to each said piston element.

10. In a rotary engine, an annular space formed between a central, a circumferential and two end parts, the central and circumferential parts being capable of relative rotation, a plurality of pistons moved in the annular space by said relative rotation, the central, circumferential or piston parts being so formed that the instantaneous displacement of each piston varies as rotation proceeds.

11. In a rotary engine, an annular space formed between a central, a circumferential and two end parts, the central and circumferential parts being capable of relative rotation, one of the end parts being a rotatable port-plate, a plurality of pistons moved in the annular space by said relative rotation, the central, circumferential or piston parts being so formed that the instantaneous displacement of each piston varies as rotation proceeds, and means for adjusting said port-plate angularly.

12. A rotary engine comprising a central part of right-cylindrical contour; a ring of right-cylindrical contour inclosing said central part and forming a continuous annular space about the same, the relative contours of said central part and said ring being such that the radial distance from said central part to said ring is different for different radial lines of measurement; a plurality of piston means spaced apart in said annular space and free from engagement one with another and each having continuous rolling contact with both said ring and said central part and dividing said annular space into a plurality of working chambers, one chamber between each pair of adjacent piston means; and means completing the inclosure at the axial ends of said annular space and providing ports for said working chambers.

13. In a rotary engine, means forming an annular space, said means comprising a central, a circumferential and two end parts; a plurality of piston means constrained to move wholly within said annular space constantly in fluid sealing contact with both said central part and said circumferential part to form a plurality of working chambers, the radial extent measured from the axis of said engine of both said circumferential part and each said piston means varying for different radial lines of measurement; and provisions governing the relative working movement between said parts and each said piston means, whereby the resultant relative movement between said parts and means effects a cycle of volumetric changes for each said working chamber.

14. In a rotary engine, means forming an annular space, said means comprising a central, a circumferential and opposite end parts, the contour of said central and circumferential parts being relatively such that different equi-angular sectors of said annular space have unequal volumes; a plurality of revoluble rotary piston-means separating said annular space into a plurality of working chambers; and suitable inlet and delivery ports for said annular space.

15. In a rotary engine, means forming an annular space, said means comprising a central and a circumferential part having right-cylindrical contour and opposite end parts; a plurality of revolving rotary piston means continuously contacting tangentially with both said central part and said circumferential part and located always wholly within said annular space, spaced apart and dividing said annular space into a plurality of working chambers, the relative configuration of said piston means, said central part and said circumferential part being such that said working chambers regularly change in volume during the revolution of said piston means; and provisions for revolving said piston means.

In testimony whereof I affix my signature in presence of two witnesses.

HERMAN DOCK.

Witnesses:
SIDNEY A. REEVE,
LEON BLUMENTHAL.